US009229247B2

(12) United States Patent
Clerc et al.

(10) Patent No.: US 9,229,247 B2
(45) Date of Patent: Jan. 5, 2016

(54) METHOD FOR PRODUCING POLARIZING LENSES, AND POLARIZING LENS OBTAINED BY SAID METHOD

(71) Applicant: BNL Eurolens, Bellegarde sur Valserine (FR)

(72) Inventors: Didier Clerc, Eloise (FR); Sebastien Martins, Apremont (FR); Franck Ledien, Echallon (FR)

(73) Assignee: BNL EUROLENS, Bellegarde sur Valserine (FR)

(*) Notice: Subject to any disclaimer, the term of this patent is extended or adjusted under 35 U.S.C. 154(b) by 0 days.

(21) Appl. No.: 14/383,232

(22) PCT Filed: Mar. 7, 2013

(86) PCT No.: PCT/EP2013/054663

§ 371 (c)(1),
(2) Date: Sep. 5, 2014

(87) PCT Pub. No.: WO2013/132034

PCT Pub. Date: Sep. 12, 2013

(65) Prior Publication Data

US 2015/0036097 A1 Feb. 5, 2015

(30) Foreign Application Priority Data

Mar. 8, 2012 (FR) ..................................... 12 00708

(51) Int. Cl.

| | |
|---|---|
| ***G02C 7/12*** | (2006.01) |
| ***G02B 1/04*** | (2006.01) |
| ***B29D 11/00*** | (2006.01) |
| ***B29C 51/14*** | (2006.01) |
| ***G02C 7/02*** | (2006.01) |
| *B29K 1/00* | (2006.01) |
| *B29K 29/00* | (2006.01) |
| *B29L 11/00* | (2006.01) |

(Continued)

(52) U.S. Cl.

CPC . *G02C 7/12* (2013.01); *B29C 51/14* (2013.01); *B29D 11/00009* (2013.01); *B29D 11/0073* (2013.01); *B29D 11/00644* (2013.01); *G02B 1/041* (2013.01); *G02C 7/02* (2013.01); *B29K 2001/12* (2013.01); *B29K 2029/04* (2013.01); *B29L 2011/00* (2013.01)

(58) Field of Classification Search

CPC .... B29D 11/00009; G02B 1/041; G02B 1/08; G02C 7/12

USPC .......... 351/159.56, 159.27, 49; 264/239, 250, 264/260; 425/425

See application file for complete search history.

(56) References Cited

U.S. PATENT DOCUMENTS

2002/0044352 A1 4/2002 Yamamoto et al.
2015/0160479 A1* 6/2015 Ohkubo .................. G02B 1/04 351/159.56

FOREIGN PATENT DOCUMENTS

EP 1 193 044 A2 4/2002
EP 1 804 088 A2 7/2007

OTHER PUBLICATIONS

PCT International Search Report and Written Opinion of the ISA dated Jun. 5, 2013 for PCT/EP2013/054663; 8 pages

*Primary Examiner* — Hung Dang

(57) ABSTRACT

The invention relates to a polarizing lens consisting, in order, of a polyamide mechanical substrate, a polyvinyl alcohol intermediate layer, and a cellulose triacetate outer layer. The invention also relates to a method for manufacturing such a lens.

12 Claims, 1 Drawing Sheet

10
1
1.2
1.1
2
3

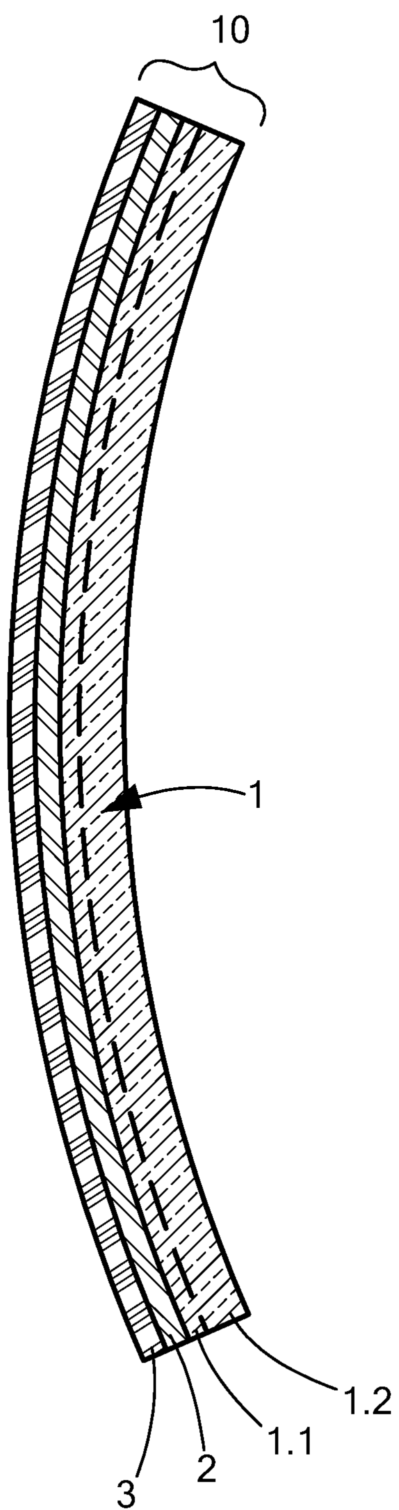
10
1
1.2
1.1
2
3

METHOD FOR PRODUCING POLARIZING LENSES, AND POLARIZING LENS OBTAINED BY SAID METHOD

CROSS REFERENCE TO RELATED APPLICATIONS

This application is a U.S. National Stage of PCT application PCT/EP2013/054663 filed in the French language on Mar. 7, 2013, and entitled "METHOD FOR PRODUCING POLARIZING LENSES, AND POLARIZING LENS OBTAINED BY SAID METHOD," which cams priority to French application FR1200708 filed Mar. 8, 2012 which is incorporated herein by reference.

The present invention relates to a process for producing polarizing lenses, and the polarizing lens obtained by said process. More particularly, the polarizing lenses obtained by the process of the invention can be used in a frame in order to form a pair of glasses such as a pair of corrective or non-corrective sunglasses, of goggle or conventional type, or a pair of corrective or non-corrective safety glasses.

The process of the invention is particularly suitable for producing non-corrective lenses. The expression "non-corrective lens" is understood to mean a lens without astigmatic or spherical power, such as those affected by the standards relating to sunglasses or to safety glasses, such as the standard EN 1836. Glasses whose lenses incorporate a polarizing filter are very common and are for example used in all the activities carried out in locations, such as the sea or snowy areas, having zones of strong light reflections. These strong reflections may indeed hamper vision and in certain cases constitute sources of glare. Such glasses are also of great interest for driving vehicles, since they make it possible to limit or even eliminate the perception of stray reflections on windshields, and for example the windshields of motor vehicles.

For these glasses, polarizing lenses are used that comprise a polarizing filter generally produced in the form of a film of polyvinyl alcohol (PVA) polymer. Such polarizing films are conventionally obtained by incorporating dichroic dye molecules and/or dichroic iodine crystals into a film based on polyvinyl alcohol, then by stretching the film uniaxially so as to orient the dichroic dye molecules and/or the dichroic iodine crystals in the direction of stretching. The expression "dichroic dye" is understood to mean a species that may be of crystalline or molecular nature and that has a favored absorption of visible electromagnetic radiation for a particular spatial orientation. The polarizing films thus obtained are inexpensive and have an optical quality that is compatible with many applications, especially ophthalmic applications.

The PVA film is then covered with one or more layers of protective material in order to form the lens.

Thus, films composed of TAC-PVA-TAC (the TAC being cellulose triacetate) are known, upon which polyamide is injected onto the rear face intended to be facing the eye.

However, it turns out that the TAC-PVA-TAC film detaches over time, which is unacceptable.

One objective of the invention is to provide an alternative structure to the known structures, which has good durability and which can be produced at least partly by injection molding. Thus, the process of the invention is devoted to the production of a thermoplastic polarizing lens.

For this purpose, a polarizing lens is provided, according to the invention, comprising, successively, a mechanical support layer comprising polyamide that forms a rear face of the lens, an intermediate layer of polyvinyl alcohol, and an outer layer made of cellulose triacetate that forms a front face of the lens.

Thus, the polyamide provides mechanical strength whilst the cellulose triacetate provides resistance to chemical interactions. When used in a glasses frame, the outer layer is oriented on the opposite side from the wearer's face. The properties of the cellulose triacetate and of the polyamide are then combined so that these materials protect one another from at least some of the external attacks.

Furthermore, with respect for example to polycarbonate, polyamide is more compatible with cellulose acetate frames. Specifically, when polycarbonate is in contact with cellulose acetate, the formation of microcracks has been observed, which may even lead to the polycarbonate eyepiece breaking. Indeed, cellulose acetate contains plasticizers which have a tendency to migrate into the polycarbonate. With polyamide, this effect of migration and formation of microcracks has not been observed.

Furthermore, polyamide also has a better resistance during and after, for example, piercing operations, during fitting to a frame.

Such lenses and their manufacturing process also have a significant advantage compared to the lenses of the prior art. Specifically, polarizing lenses based on polyamide are produced in particular by the use of a polarizing film comprising a birefringent polyamide front layer, a polyvinyl alcohol film, and a stretched polyamide rear layer, the latter being made to merge with the polyamide representing the constituent material of the lens during the implementation of the injection molding process. It will easily be understood that the constraints linked to the use of a birefringent polyamide layer and of a stretched polyamide layer lead to limitations both in the accessibility of the choice of constituent materials of the polarizing film and in its processing conditions, and also in the properties and performances of the polarizing lenses thus obtained.

Finally, the process according to the invention has another additional advantage, which is that it can be produced by simple contacting of the molds without needing vacuum or pressure-reducing operations as is the case for the known processes, carried out by machines, for example of LEMA type in Italy. Thus, the cycle time for the manufacture of polarizing lenses can be reduced, thus staking it possible to further reduce the manufacturing costs.

The object of the invention is therefore to provide a novel alternative in polarizing lens manufacture.

The manufacturing process according to the invention comprises the steps of:

- preheating a laminated film comprising an outer layer of cellulose triacetate (CTA), an intermediate layer of polyvinyl alcohol (PVA) and an outer layer of polyamide with different temperatures for the outer layers of the film,
- thermoforming said preheated film by carrying out a differentiated heating of the outer layers,
- placing the thermoformed film in a lens-shaped mold so that the outer layer of cellulose triacetate extends against one wall of the mold,
- injecting polyamide into the mold so that the polyamide layer merges with the injected polyamide in order to form the mechanical support layer of the lens,
- removing the lens thus formed from the mold.

The differentiated heating of the film makes it possible to carry out a thermoforming adapted to the heterogeneity of the materials constituting the outer layers of the film.

The temperature difference is such that the convex part of the mold, that is to say the concave part of the lens, is heated more than the concave part of the mold (convex part of the lens). The temperature difference is between 10° C. and 15° C.

Other features and advantages of the invention will emerge on reading the following description of one particular non-limiting embodiment of the invention.

Reference will be made to the single appended FIGURE representing, in cross section, a lens in accordance with the invention.

The invention relates to a corrective or non-corrective polarizing lens comprising, successively, a mechanical support layer 1 made of polyamide. In particular of nylon, an intermediate layer 2 made of polyvinyl alcohol (PVA) and an outer layer 3 made of cellulose triacetate (CTA). The adhesive layers optionally necessary to maintain cohesion of the layers are not mentioned. The invention preferably relates to a non-corrective polarizing lens.

The mechanical support layer 1 forms the rear face of the lens and is arranged in order to impart its mechanical properties and in particular its rigidity to the lens. The thickness of the mechanical support layer is thus defined as a function of the desired rigidity and of the desired mechanical strength. It is also defined in accordance with the optical properties of the lens.

The outer layer 3 forms the front face of the lens.

The rear face and the front face of the lens may optionally be covered by any coating usually used in the field of ophthalmic lenses to provide the polarizing lens with a complementary function. Among the functional coatings that may be placed on one and/or the other face of the lens, mention may be made, nonlimitingly, of the coatings that make it possible to additionally impart to the lens an impact-resistant function, an anti-reflection function, a scratch-resistant function, an anti-soiling function, an anti-fog function, an anti-static function or a combination of some of these functions.

The process comprises the step of taking a laminated film 10 comprising the cellulose triacetate outer layer 3, the polyvinyl alcohol intermediate layer 2 and an outer layer 1.1 of polyamide, in particular of nylon.

The film 10 is then cut along a contour corresponding to that of the lens.

The cut film 10 is then bent. This operation is carried out by thermoforming.

The thermoforming is preceded by a drying which makes it possible to improve the behavior of the film during the thermoforming and to stabilize the colors of the film 10.

After the drying, a preheating of the film 10 is carried out that aims to facilitate the thermoforming. During the preheating, the outer layers are heated at different temperatures. The temperature difference for the preheating is less than or equal to 15° C., the temperature on the cellulose triacetate (CTA) side being lower than that of the polyamide side.

The actual thermoforming is carried out in a mold comprising a concave part and a convex part. The film 10 is placed in the mold, the concave and convex parts of which, each in contact with one of the outer layers, are heated at different temperatures. The convex part of the mold is heated at a temperature above that of the concave part of the mold. The temperature difference is leas than or equal to 15° C.

The deformation of the film 10 results from the application, in the presence of heat, of a pressure via the parts of the mold, it being possible for the final pressure to reach between 40 and 60 t if twelve lenses are produced at once.

Advantageously, in this thermoforming process, the pressure exerted in order to enable the deformation of the film is exerted gradually and in a controlled manner. This controlled application of the pressure by the use of suitable means within the mold makes it possible to control the deformation.

The heating temperatures take into account the glass transition temperatures of the materials of the outer layers and are in particular adjusted as a function of this physical parameter.

The process is continued with the step of placing the thermoformed film 10 into a lens-shaped injection mold.

In one alternative embodiment of the process, a step of drying the thermoformed film may be carried out prior to the step where the thermoformed film is placed in the injection mold, especially in the case where the film is not immediately used after the thermoforming step.

The curved film 10 is placed in the injection mold so that the outer cellulose triacetate layer 3 extends against one wall of the mold formed by the concave part of the mold whilst a space remains between the outer layer 1.1 and the opposite wall of the mold formed by the convex part of the mold.

An injection of polyamide, in particular of nylon into said space of the mold is then carried out so that the outer polyamide layer 1.1 merges with the injected polyamide 1.2 in order to form the mechanical support layer 1 of the lens. It will be noted in the FIGURE that the outer polyamide layer 1.1 is separated from the injected polyamide 1.2 by a dotted line for the purposes of explaining the production process of the invention. In reality, on the finished lens, only one layer of polyamide normally appears since the outer polyamide layer 1.1 of the film 10 merges with the injected polyamide 1.2 in order to form a single layer. The parameters of the injection molding operation, and more particularly the temperature of the injected polyamide, the injection speed and/or pressure, the position of the injection point or points, are determined specifically and are linked to the nature of the polarizing film used in the process.

Once the polyamide has cooled sufficiently, the lens thus formed is removed from the mold.

Of course, the invention is not limited to the embodiments described but encompasses any variant that falls within the field of the invention as defined by the claims.

In particular, the lens may comprise a corrective portion. The lens may have its definitive shape or else be of circular shape. In the latter case, it is up to the optician to machine the lens (generally by milling) in order to give it a shape suitable for the frame for which it is intended.

The invention can be applied to glasses of conventional type comprising two lenses but also to glasses of goggle type comprising a single lens.

The invention claimed is:

1. A process for producing a lens, comprising:

preheating a laminated film, comprising first and second outer layers with the first outer layer having first and second opposing surfaces and comprising cellulose triacetate (CTA), an intermediate layer having first and second opposing surfaces and comprising polyvinyl alcohol (PVA), wherein the first surface of the intermediate layer is disposed over the second surface of the first outer layer and the second outer layer has first and second opposing surfaces and is comprised of polyamide, wherein the first surface of the second outer layer is disposed over the second surface of the intermediate layer, and wherein preheating the laminated film comprises preheating the first outer layer to a first temperature and preheating the second outer layer to a second, different temperature;

thermoforming the preheated laminated film, wherein the first outer layer is heated at a third temperature and the second outer later is heated at a fourth, different temperature;

disposing the thermoformed film in a lens-shaped mold having at least first and second opposing surfaces, wherein the first surface of the first outer layer of the laminated film is adapted to couple to the first surface of the lens-shaped mold;

injecting polyamide into the lens-shaped mold such that the second outer layer couples with the injected polyamide to form a mechanical support layer of the lens; and decoupling the lens from the lens-shaped mold.

2. The process as claimed in claim 1, wherein preheating the laminated film further comprises:

drying the laminated film.

3. The process as claimed in claim 1, wherein thermoforming the preheated laminated film comprises:

thermoforming the preheated laminated film in a mold comprising a convex part adapted to couple to the second surface of the first outer layer and a concave part adapted to couple to the first surface of the second outer layer.

4. The process as claimed in claim 3, comprising:

heating the convex part of the mold at the third temperature and the concave part of the mold at the fourth, different temperature.

5. The process as claimed in claim 4, wherein the third temperature is higher than the fourth temperature.

6. The process as claimed in claim 5, wherein temperature difference between the third and fourth temperatures is less than or equal to about 15 degrees Celsius (° C.).

7. The process as claimed in claim 1, wherein temperature difference between the first and second temperatures during the preheating is less than or equal to about 15° C.

8. The process as claimed in claim 1, wherein thermoforming said preheated laminated film comprises:

deforming the preheated laminated film by application of a controlled pressure.

9. The process as claimed in claim 1, wherein the polyamide is nylon.

10. A polarizing lens having a front face and a rear face, wherein the front face corresponds to a first surface of the polarizing lens and the rear face corresponds to a second opposing surface of the polarizing lens, the polarizing lens comprising:

a mechanical support layer having a second surface corresponding to the second surface of the polarizing lens and a first opposing surface, said mechanical support layer comprising polyamide, an intermediate layer having first and second opposing surfaces, said intermediate layer comprising polyvinyl alcohol, wherein the second surface of the intermediate layer is disposed over the first surface of the mechanical support layer, and first outer layer having a first surface corresponding to the first surface of the polarizing lens and a second opposing surface, said outer later comprising cellulose triacetate, wherein the second surface of the outer layer is disposed over the first surface of the intermediate layer, wherein the polarizing lens is produced by:

preheating a laminated film comprising the first outer layer, the intermediate layer and a second outer layer having first and second opposing surfaces, said second outer layer comprising polyamide, wherein the first surface of the second outer layer is disposed over the second surface of the intermediate layer and the first outer layer is preheated at a first temperature and the second outer layer is preheated at a second, different temperature;

thermoforming said preheated laminated film, wherein the first outer layer is heated at a third temperature and the second outer layer is heated at a fourth, different temperature;

disposing the thermoformed film in a lens-shaped mold having at least first and second opposing surfaces. wherein the first surface of the first outer layer is adapted to couple to the first surface of the lens-shaped mold;

injecting polyamide into the lens-shaped mold such that the second outer layer couples with the injected polyamide to form the mechanical support layer; and decoupling the lens from the lens-shaped mold.

11. The polarizing lens as claimed in claim 10, wherein the lens is provided as a corrective polarizing lens.

12. The polarizing lens as claimed in claim 10, wherein the lens is provided as a non-corrective polarizing lens.

* * * * *